United States Patent
Sasaki

(10) Patent No.: US 9,740,286 B2
(45) Date of Patent: Aug. 22, 2017

(54) CHARACTER STRING RETRIEVAL APPARATUS

(75) Inventor: Yasushi Sasaki, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 385 days.

(21) Appl. No.: 13/818,952

(22) PCT Filed: Aug. 18, 2011

(86) PCT No.: PCT/JP2011/004611
§ 371 (c)(1),
(2), (4) Date: Feb. 25, 2013

(87) PCT Pub. No.: WO2012/026095
PCT Pub. Date: Mar. 1, 2012

(65) Prior Publication Data
US 2013/0151961 A1    Jun. 13, 2013

(30) Foreign Application Priority Data

Aug. 26, 2010    (JP) ................................ 2010-189945

(51) Int. Cl.
*G06F 3/01*         (2006.01)
*G06F 3/0488*      (2013.01)
(Continued)

(52) U.S. Cl.
CPC .............. *G06F 3/016* (2013.01); *G06F 3/021* (2013.01); *G06F 3/03543* (2013.01);
(Continued)

(58) Field of Classification Search
CPC .. G06F 17/30696; G06F 3/0488; G06F 3/021; G06F 3/04855; G06F 3/03543;
(Continued)

(56) References Cited

U.S. PATENT DOCUMENTS 5,736,978 A * 4/1998 Hasser .................... G06F 3/016
345/156
6,161,126 A * 12/2000 Wies ...................... G05B 19/00
709/203

(Continued)

FOREIGN PATENT DOCUMENTS

JP    H09-204439 A    8/1997
JP    2002-197089 A    7/2002
(Continued)

OTHER PUBLICATIONS

Krause et al. Context-Aware Mobile Computing: Learning Context-Dependent Personal Preferences from a Wearable Sensor Array. IEEE Transactions on Mobile Computing, vol. 5, No. 2, Feb. 2006. 15 pages.*

(Continued)

*Primary Examiner* — Amy M Levy
(74) *Attorney, Agent, or Firm* — Studebaker & Brackett PC

(57) ABSTRACT

In order to enable an operator to unfailingly recognize a retrieved character string displayed on a display unit as a result of retrieval from a target such as text, a character string retrieval apparatus 1 for retrieving the character string from the target includes a display unit 20 for displaying a retrieval result of the character string, an operation unit 30 for detecting an input operation, a tactile sensation providing unit 40 for vibrating the operation unit 30, and a control unit 10 for shifting an area of the retrieval result of the character string displayed on the display unit 20, based on the input operation detected by the operation unit 30, and, when displaying the retrieved character string on the display unit 20, for controlling the tactile sensation providing unit 40 such that a tactile sensation is provided to an object pressing the operation unit 30.

12 Claims, 6 Drawing Sheets

(51) Int. Cl.
  *G06F 3/02* (2006.01)
  *G06F 3/0354* (2013.01)
  *G06F 3/0489* (2013.01)
  *G06F 3/0485* (2013.01)
  *G06F 17/30* (2006.01)
  *H04M 1/2745* (2006.01)

(52) U.S. Cl.
  CPC ........ *G06F 3/0488* (2013.01); *G06F 3/04855* (2013.01); *G06F 3/04892* (2013.01); *G06F 17/30696* (2013.01); *H04M 1/274558* (2013.01); *G06F 2203/014* (2013.01)

(58) Field of Classification Search
  CPC ................ G06F 3/04892; G06F 3/016; G06F 2203/014; H04M 1/274558
  USPC .......................................................... 715/702
  See application file for complete search history.

(56) References Cited

U.S. PATENT DOCUMENTS

| | | | | |
|---|---|---|---|---|
| 6,219,034 | B1* | 4/2001 | Elbing | G06F 3/016 345/158 |
| 6,288,705 | B1* | 9/2001 | Rosenberg | G06F 3/016 345/157 |
| 7,770,130 | B1* | 8/2010 | Kaptelinin | G06F 3/04855 715/251 |
| 8,232,969 | B2* | 7/2012 | Grant | G06F 3/016 178/18.07 |
| 2002/0145631 | A1* | 10/2002 | Arbab | G06F 3/04855 715/786 |
| 2005/0149334 | A1* | 7/2005 | Chen | 704/275 |
| 2006/0033716 | A1* | 2/2006 | Rosenberg | G06F 3/016 345/163 |
| 2006/0082554 | A1* | 4/2006 | Caine | G06F 3/016 345/167 |
| 2006/0098899 | A1* | 5/2006 | King et al. | 382/305 |
| 2006/0267949 | A1* | 11/2006 | Rosenberg | G06F 3/016 345/168 |
| 2007/0165019 | A1* | 7/2007 | Hale | G06Q 10/00 345/418 |
| 2009/0063472 | A1* | 3/2009 | Pell | G06F 17/30696 |
| 2009/0167509 | A1* | 7/2009 | Fadell | G06F 3/016 340/407.2 |
| 2010/0105370 | A1* | 4/2010 | Kruzeniski | G06F 3/0482 455/414.3 |
| 2010/0188327 | A1* | 7/2010 | Frid | G06F 3/016 345/156 |
| 2010/0278453 | A1* | 11/2010 | King | G06Q 10/10 382/321 |
| 2011/0128227 | A1* | 6/2011 | Theimer | G06F 3/016 345/167 |
| 2013/0024449 | A1* | 1/2013 | Chatterji | G06F 17/30864 707/728 |
| 2013/0331071 | A1* | 12/2013 | Statler | H04L 67/20 455/414.2 |

FOREIGN PATENT DOCUMENTS

| | | |
|---|---|---|
| JP | 2005-322046 A | 11/2005 |
| JP | 2009-015598 A | 1/2009 |

OTHER PUBLICATIONS

International Search Report; PCT/JP2011/004611; Sep. 20, 2011.
An Office Action; "Notification of the First Office Action," issued by the State Intellectual Property Office of China on Mar. 24, 2015, which corresponds to Chinese Patent Application No. 201180041382.7 and is related to U.S. Appl. No. 13/818,952; with English language translation.

* cited by examiner

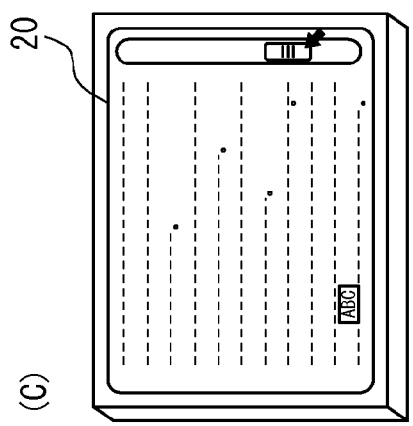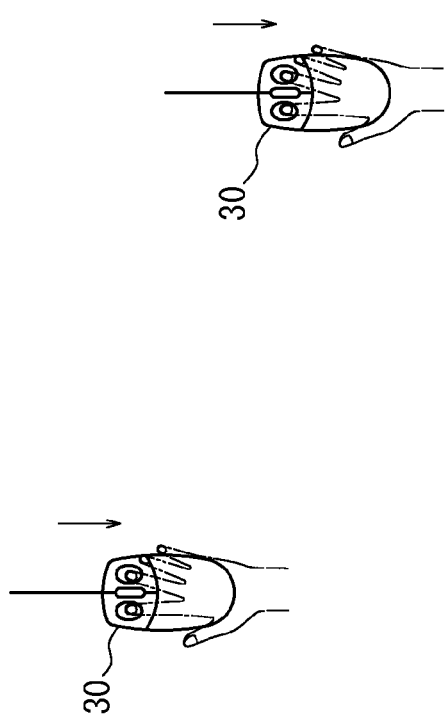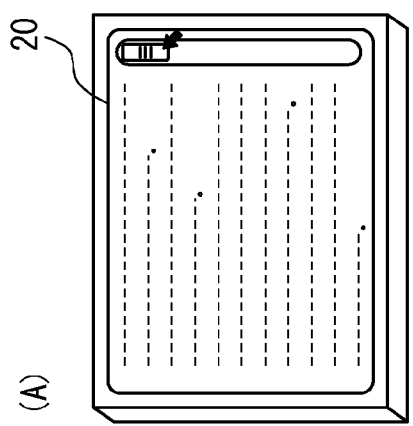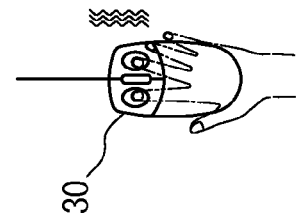
FIG. 5

CHARACTER STRING RETRIEVAL APPARATUS

CROSS REFERENCE TO RELATED APPLICATION

This application claims priority to and the benefit of Japanese Patent Application No. 2010-189945 filed on Aug. 26, 2010, the entire contents of which are incorporated herein by reference.

TECHNICAL FIELD

The present invention relates to a character string retrieval apparatus for retrieving a character string from a target such as a text file.

BACKGROUND ART

Recent personal computers (PCs) often have a function to retrieve a character string from the text file as a basic function of Operating System (OS). By using such OS, the PC described above, based on the character string input by an operator with a keyboard or the like, for example, may retrieve the character string from the text file and, when the character string is contained in the text file, display the character string on a display unit such as a display. In displaying the character string retrieved as a result of the retrieval on the display unit as described above, the PC generally jumps to a position displaying the character string in the text file or colors the character string. Such a function to retrieve the character string, due to the widespread of internet-related techniques in recent years, has been increasingly required and has become significantly important.

There are suggested a variety of techniques to improve usability of the function to retrieve the character string. For example, there is suggested a character string retrieval system that enables simple and rapid retrieval of a character string in a plurality of files prepared by one or more application programs (for example, see Patent Document 1).

The system described in Patent Document 1 displays the plurality of files prepared by one or more application programs (hereinafter, referred to simply as an "application" in the present specification and drawings) in the respective windows on the display unit. The operator may, via a setting panel displayed on the display unit, set a character string as a common retrieval criterion for files selected from the files displayed in the plurality of windows. Upon receiving a retrieval instruction as described above, the system may retrieve the character string set by the operator in each of the selected files and display the character string retrieved from the files as a result in each of the windows of the selected files.

RELATED ART DOCUMENT

Patent Document

Patent Document 1: Japanese Patent Laid-Open No. 2002-197089

SUMMARY OF INVENTION

Technical Problem

For example, in conducting a web search by using an internet browser, the operator may retrieve websites by inputting a keyword for the retrieval by using the keyboard or the like. When a web search is performed based on the input keyword and there are websites that contain the keyword, a list of links to the websites containing the keyword is generally displayed. By jumping to the linked website, the operator may view the website that contains a retrieved keyword. In such a search, however, it is necessary to further look for a position that includes the retrieved keyword in the website. In this case, general apparatuses such as the PC, based on the keyword re-input by the operator, may jump to the position including the keyword by using the function of the OS or the browser. Some functions of the OS and the browser may color, to highlight, the keyword retrieved based on the initial input when the keyword is displayed in the website.

Incidentally, recent small mobile terminals such as mobile phones may activate the internet browser and perform an operation similar to the retrieval by the PC described above. As well as use of the browser as described above, the mobile terminals have enabled to execute other functions that had been executed mainly by the PC. Also, since storage capacities of flash memories and the like equipped in the mobile terminals have been dramatically increased, the mobile terminals may store a great amount of various data such as images and music files as well as text data. Recently, accordingly, the operator is very likely to, by using the small terminal such as the mobile phone, wish to retrieve a desired character string from a fairly large-sized file.

However, when the website is retrieved as described above by using the mobile terminal such as the mobile phone, since a display screen of the mobile terminal is small in size, the retrieved keyword may often not displayed in an initial display of a retrieval result.

In such a case, the mobile terminal, based on the keyword re-input by the operator as described above, may jump to the position including the keyword and display the position. However, it is troublesome for the operator to re-input the same keyword that has been previously input by the operator for the retrieval. When the mobile terminal is used, an input device is often limiting and thus generally more troublesome for the operator than an input by using the keyboard of the PC. For example, although multi-tap input method (character flipping, toggle input) uses fewer keys for the input, the number of times to press the key is increased in comparison to the input by using a usual keyboard of the PC. Accordingly, the mobile terminals such as the mobile phones that require as fewer inputs of the character string such as the keyword as possible offers better usability.

As such, the above technique to color the keyword when the keyword retrieved based on the original input is displayed in the screen may be adopted to the mobile terminal. Coloring the retrieved keyword allows the operator to easily spot the keyword when scrolling through the retrieval result in the display screen. Since the operator may generally scroll the display screen by repeating a simple operation, the scrolling may save an operator's effort to re-input the keyword. Also, when the retrieved keyword is scattered at a number of positions, the operator, by scrolling through the display screen, may easily shift to a next position of the retrieved keyword.

However, even when the retrieved keyword is displayed in color, the operator needs to carefully observe the display screen while scrolling the display screen in order not to miss the colored keyword. As described above, since the recent mobile phones have high capacity memories, the data of the target may be in a large size. In retrieving the keyword in such large-sized data as described above also, the operator needs to carefully observe the small display screen of the mobile phone in order not to miss the colored keyword. Accordingly, from a point of view of maintaining attention, sight and concentration in the retrieval as described above, the operator is under a heavy load during a retrieval operation.

In this case, for example, a font size of characters may be reduced such that more characters are displayed at once in the display screen, thereby information browsable at once in the display screen may be increased. However, since the display screen of the mobile terminal is generally very small in size, increasing the information brows able at once in the display screen causes a problem that the displayed characters become smaller in size and the operator may easily miss the keyword. The mobile terminal, by its nature, is often operated by the operator while the operator is carrying the mobile terminal and carrying out another operation. Therefore, the operator may not always carefully observe the small display screen. For such a reason, in retrieval of the character string such as the keyword by using the mobile terminal, the operator is generally required an effort not to miss the keyword retrieved as a result.

Accordingly, the present invention in consideration of such a condition is to provide a character string retrieval apparatus capable of enabling the operator to unfailingly recognize that, as a result of retrieval of the character string from the target such as the text, the retrieved character string is displayed on the display unit.

Solution to Problem

In order to achieve the above object, a character string retrieval apparatus for retrieving a character string from a target (for example, a text file or the like) according to a first aspect of the present invention includes:

a display unit (display of the like) configured to display a retrieval result of the character string;

an operation unit (input device such as a keyboard or a touch sensor) configured to detect an input operation;

a tactile sensation providing unit configured to vibrate the operation unit; and a control unit configured to, based on the input operation detected by the operation unit, control to shift (scroll) an area of the retrieval result of the character string displayed on the display unit, wherein the control unit, in displaying a retrieved character string on the display unit, controls the tactile sensation providing unit such that a tactile sensation is provided to a pressing object (an operator's finger or the like) pressing the operation unit.

A second aspect of the present invention is the character string retrieval apparatus according to the first aspect, wherein the control unit, in displaying the retrieved character string together with a predetermined number of characters before or after the retrieved character string on the display unit, controls the tactile sensation providing unit such that the tactile sensation is provided to the pressing object.

A third aspect of the present invention is the character string retrieval apparatus according to the first or second aspect, wherein the control unit, in displaying the retrieved character string on the display unit, controls to disable the input operation detected by the operation unit for a predetermined time.

Effect of the Invention

According to the present invention, the character string retrieval apparatus may enable the operator to unfailingly recognize that the retrieved character string is displayed on the display unit as a result of retrieval of the character string from a target such as text and the like.

BRIEF DESCRIPTION OF DRAWINGS

FIG. 5(A) to (C) are diagrams illustrating still another example of the action of the character string retrieval apparatus illustrated in FIG. 1.

DESCRIPTION OF EMBODIMENT

An embodiment of the present invention will be described with reference to the accompanying drawings. A character string retrieval apparatus according to the present embodiment shifts a retrieval result of a character string displayed on a display unit based on an input operation to an operation unit and, when a retrieved character string is displayed on the display unit, controls a tactile sensation providing unit to provide a tactile sensation.

Figure 1:
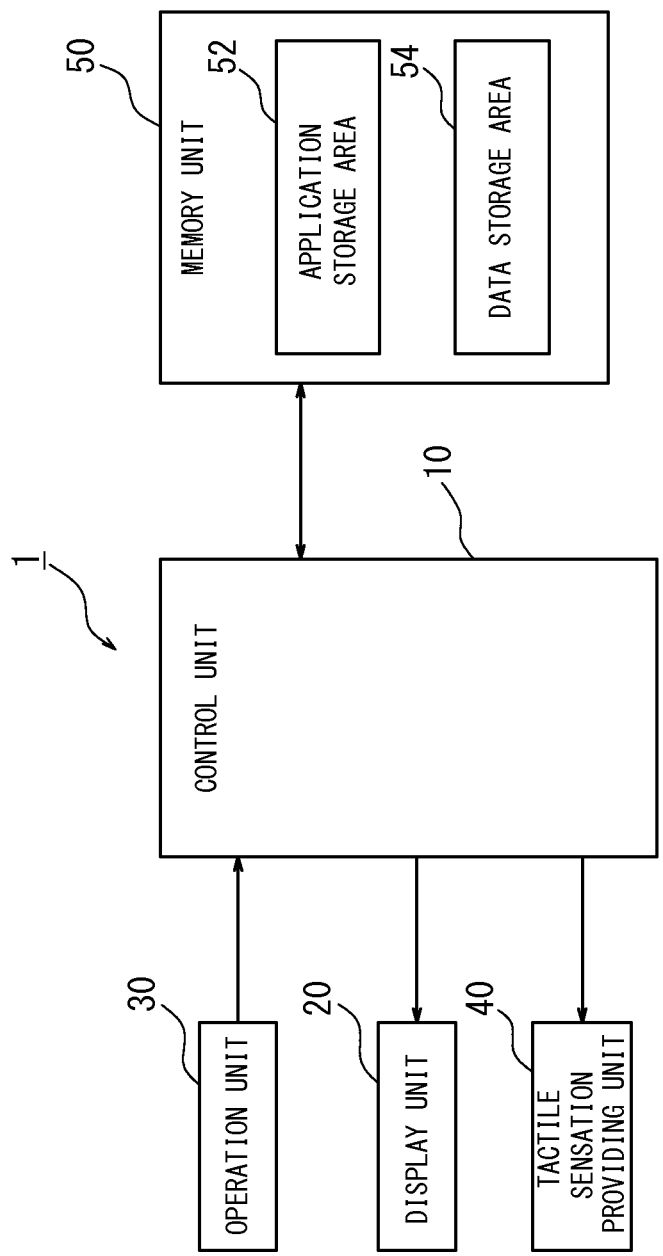
FIG. 1 is a block diagram illustrating a schematic configuration of a character string retrieval apparatus according to an embodiment.

FIG. 1 is a block diagram illustrating a schematic configuration of the character string retrieval apparatus according to the embodiment of the present invention.

As illustrated in FIG. 1, a character string retrieval apparatus 1 includes a control unit 10, a display unit 20, an operation unit 30, a tactile sensation providing unit 40 and a memory unit 50.

The control unit 10 controls an entire character string retrieval apparatus 1 including each function unit thereof. The control unit 10 determines whether a character string matching a keyword for retrieval, which is input via the operation string matching the keyword for retrieval is contained, the control unit 10 outputs position information of the character string (position information of data) in the target. An operation of the control unit 10 according to the present embodiment will be further described below. Character string retrieval algorithm, similar to one used for a retrieval function incorporated in conventional OSs or browsers, is applicable, thus a detailed description thereof will be omitted.

The display unit 20 displays the retrieval result of the character string and the like retrieved from the target. The display unit 20 may be a display having, for example, a liquid crystal display panel (LCD), an organic EL display panel or the like.

The operation unit 30 detects an input operation by an operator. For example, the operation unit 30 detects an input of a keyword the operator wishes to retrieve and the input operation to shift the retrieval result on the display unit 20. The operation unit 30 may be constituted by using an input device of various types such as a mechanical push-button switch or a touch sensor.

When the operation unit 30 is constituted by using the input device such as mechanical keys constituting a keyboard or a mouse used to operate a PC, the operation unit 30 is generally provided separately from the display unit 20. On the other hand, when the operation unit 30 includes the touch sensor, the operation unit 30 is generally disposed on top of the display unit 20 such that an input operation to an object displayed on the display unit 20 by applying pressure of an operator's finger or the like (pressing object) is detected at a corresponding position on a touch face of the touch sensor. When the operation unit 30 has the touch sensor as described above, the control unit 10 detects a pressing position on the touch face and determines whether the detected pressing position corresponds to a position of the object such as a button or the like displayed on the display unit 30. When the operation unit 30 has the touch sensor, the touch sensor may be of a resistive film type, a capacitive type, an optical type or the like, for example.

The tactile sensation providing unit 40 has a piezoelectric vibrator or the vibrating the operation unit 30, provides the tactile sensation to the pressing object pressing the operation unit 30. The pressing object pressing the operation unit 30 is, for example, the operator's finger or the like. According to the present invention, the expression "pressing" includes both of a pressing state applying a load and a contact state. Although the pressing may be detected by a load detection unit, which is separately provided, if the tactile sensation providing unit 40 has the piezoelectric vibrator, the pressing may be detected by strain of the piezoelectric vibrator caused when the operation unit is pressed. Also, if the operation unit 30 has the touch panel of the resistive film type, the pressing may be detected from a change in an output signal based on a change of resistance according to a contact area. Further, when the operation unit 30 has the touch panel of the capacitive type, the pressing may be detected from a change in an output signal based on a change of capacitance. Configurations described above eliminate the necessity to add a separate component for detection of the pressing. Also, when the operation unit 30 has the touch sensor, the contact may be detected by corresponding methods.

The memory unit 50 may be constituted by using any storage source such as a flash memory or the like and may store a variety of information (data). In an example illustrated in FIG. 1, the memory unit 50 includes an application storage area 52 and a data storage area 54. The application storage area 52 stores various applications to be activated by the character string retrieval apparatus 1. According to the present embodiment, the application storage area 52 especially stores an application having a function to retrieve the character string from the target generally equipped as a function of the OS or the browser. The data storage area 54 stores various data including data used in association with activation of the application described above. The memory unit 50 may include a variety of storage areas in addition to the storage areas described above, based on information to be stored.

Figure 2:
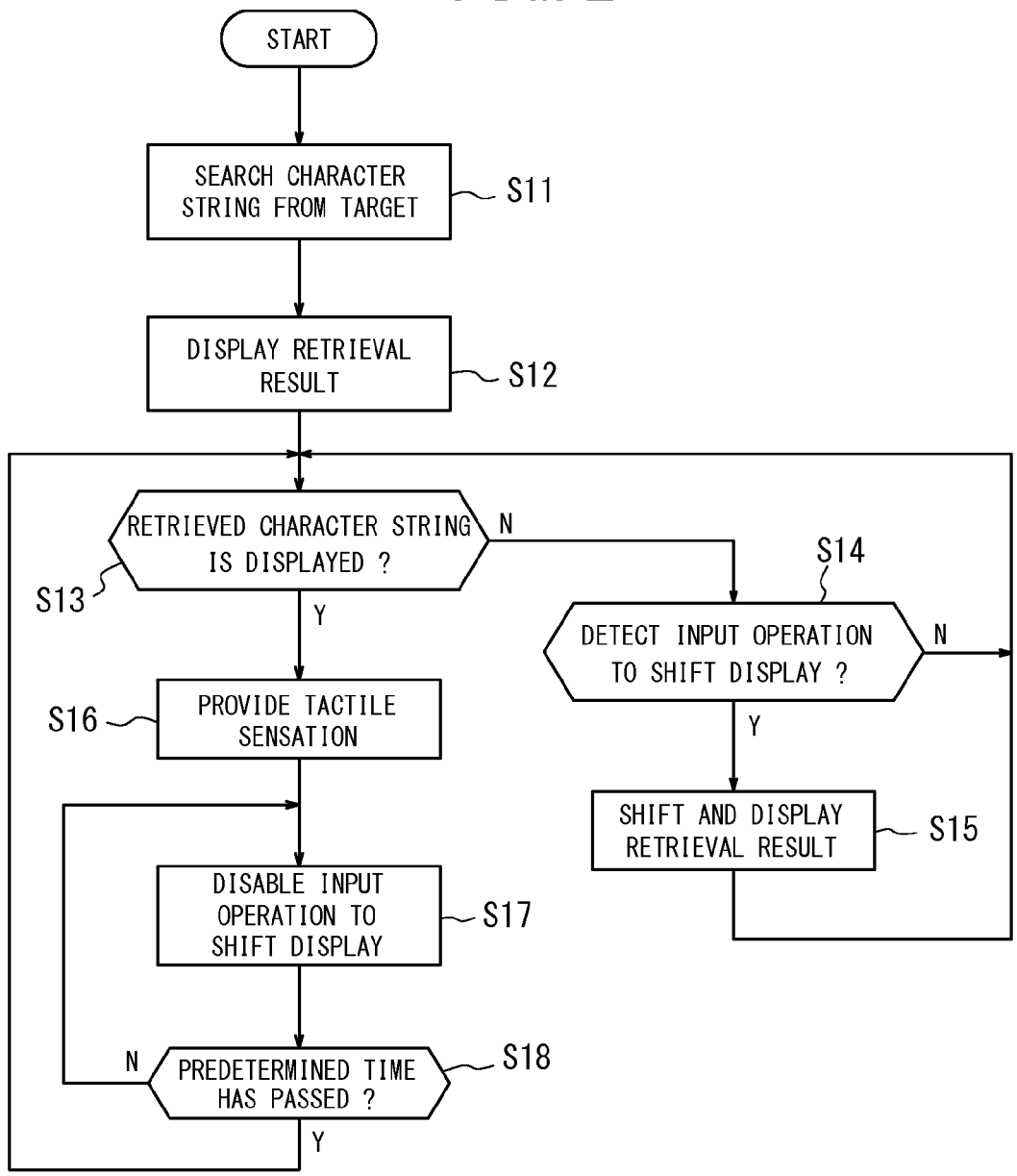
FIG. 2 is a flowchart of an operation by the character string retrieval apparatus illustrated in FIG. 1.

Next, an operation of the character string retrieval apparatus 1 according to the present embodiment will be described. FIG. 2 is a flowchart illustrating the operation of the character string retrieval apparatus 1. The character string retrieval apparatus 1 the display unit 30 as the retrieval result is shifted after the retrieval of the character string, provides the tactile sensation such that the operator recognizes that the retrieved character string is displayed.

The operation illustrated in FIG. 2 starts at a point when the operator inputs the character string to be retrieved from the target such as the text file via the operation unit 30, for example, to the character string retrieval apparatus 1. When the character string to be retrieved is input to the character string retrieval apparatus 1, the control unit 10 performs a retrieval operation of the input character string from the target (step S11). In detail, for example, the control unit 10 determines whether the input character string is contained in the target and, when the character string is contained, obtains information about a position of the character string (a part containing data) in the target. Therefore, when the character string input by the input operation by the operator is contained in the target, the control unit 10 may determine the position (part) of the retrieved character string in the target.

According to the present embodiment, a case in which the control unit 10 retrieves an application necessary for the retrieval operation from the application storage area 52 and executes the application will be described. In this case, the control unit 10 may retrieve the character string in the data by retrieving the data of the target such as the text file stored in the data storage area 54 of the memory unit 50. As described below, however, both of the application necessary for the retrieval operation and the data of the target may be externally received via a communication unit.

According to the present embodiment, since the retrieval operation of a specific character string from the target may be performed in a manner similar to operations by ordinary OSs and browsers, a detailed description of a configuration and processing of the retrieval operation will be omitted. A variety of existing algorithm and the like may be used for the retrieval operation, and a detailed mode of the operation is not limited to a mode described above.

After performing the retrieval operation at step S11 as described above, the control unit 10 controls the display unit 20 to display the retrieval result (step S12). At this time, when the retrieved character string is initially displayed on the display unit 20, the operator may easily spot the retrieved character string in the retrieval result. In using a mobile terminal, however, since an area of the display unit 20 to be able to display a display screen is very limited, the retrieved character string may not often be displayed initially on the display unit 20.

When the retrieval result is displayed at step S12, the control unit 10, based on the position information of the retrieved character string, determines whether the retrieved character string is displayed on the display unit 20 (step S13). That is, at step S13, the control unit 10 determines whether the retrieved character string is contained in the retrieval result displayed on the display unit 20 at step S12.

When the retrieved character string is not displayed on the display unit 20 yet, it is expected that the operator performs, via the operation unit 30, the input operation to shift a displayed area of the search result on the display unit 20 by scrolling. Accordingly, when the retrieved character string is not displayed on the display unit 20 at step S13, the control unit 10 determines whether the operation unit 30 has detected the input operation to shift the display screen on the display unit 20 by scrolling (step S14). When the input operation to shift the display screen is not detected at step S14, the control unit 10 returns to step S13 and continues the operation.

On the other hand, when the input operation to shift the display screen is detected at step S14, the control unit 10, based on the input operation, shifts an area of the search result displayed on the display unit 30 (step S15). That is, at step S15, the control unit 10, based on the input operation detected by the operation unit 30, controls to shift the area of the search result displayed on the display unit 20.

Thereby, the control unit 10, based on an input amount (input value) based on the input operation, scrolls the displayed area of the search result on the display unit 20.

For example, when the operation unit 30 has the touch sensor and the input amount (input value) based on the input operation is large such as when a slide bar displayed on the display unit 20 is shifted by a great amount, the displayed area of the search result on the display unit 20 is scrolled by a great amount. On the other hand, when the input amount (input value) based on the input operation is small such as when the slide bar displayed on the display unit 20 is slightly shifted, the displayed area of the search result on the display unit 20 is slightly scrolled.

In this case, the input amount (input value) based on the input operation, when the operation unit 30 has the touch sensor, may be an amount (a distance) of a sliding operation on the touch sensor by the operator. In this case, preferably, a predetermined object for shifting the display screen, such as the slide bar or a scroll bar, is displayed on the display unit 20 at a position corresponding to a position of the sliding operation of the operation unit 30. Then, the operation unit 30 detects a sliding amount of the sliding operation of the object by the operator as the input amount based on the input operation.

When the operation unit 30 includes the input device such as the mouse or the like, a dragging amount to drag the slide bar or the scroll bar displayed on the display unit 20 by the operator using the mouse may be used as the input amount based on the input operation. In this case, alternatively, a rotation amount of a scroll wheel for scrolling through the displayed area on the display unit 20 may be used as the input amount based on the input operation. Further, when the operation unit 30 has a usual keyboard, for example, a pressing time for the operator to maintain pressing down a predetermined key, such as page up and page down keys on the keyboard, may be used as the input amount based on the input operation.

When the retrieval result is shifted and displayed at step S15, the control unit 10, based on the position information of the retrieved character string, determines whether the retrieved character string is displayed on the display unit 20 (step S13). When the retrieved character string is not yet displayed on the display unit 20 at step S13, the control unit 10 proceeds to step S14 again to perform the operation at and after step S14.

On the other hand, when the retrieved character string is displayed on the display unit 20 at step S13, the control unit 10, in order to notify that the retrieved character string required by the operator is displayed, controls the tactile sensation providing unit 40 to provide the tactile sensation by vibration (step S16). That is, the control unit 10, when displaying the retrieved character string on the display unit 20, controls the tactile sensation providing unit 40 such that the tactile sensation is provided to the pressing object pressing the operation unit 30.

Thereby, when the retrieved character string is displayed on the display unit 20, vibration is provided to the operator's finger or the like operating the operation unit 30. Accordingly, the operator, even when shifting the displayed area of the search result, may unfailingly recognize that the retrieved character string is displayed on the display unit 20. Note that, when being displayed on the display unit 20 as described above, the retrieved character string is preferably displayed in color different from background color for a highlighting purpose such that the operator may easily spot the retrieved character string at a glance.

After provision of the tactile sensation at step S16, the control unit 10, when the operation unit 30 detects an input operation to further shift the displayed area of the retrieval result, preferably disables such an input operation (step S17). As described above, after provision of the tactile sensation, the input operation to shift the displayed area is disabled for a predetermined time (step S18), preferably. According to the present embodiment, that is, when displaying the retrieved character string on the display unit 20, the control unit 10 controls to disable the input operation detected by the operation unit 30 for the predetermined time (steps S17, S18).

This is a measure taken in consideration of a slight time lag between when the operator recognizes that the retrieved character string is displayed on the display unit 20 as the tactile sensation is provided and when the operator stops the input operation. Such a measure enables, when the operator fails to stop the input operation upon perception of the tactile sensation, to avoid continuously shifting the displayed area, moving the retrieved character string beyond the display screen on the display unit 20. Accordingly, when an operator who is not good at a fine and quick input operation necessary for operating a small mobile terminal such as the mobile phone is operating, the operator does not feel inconvenient.

However, when the time to disable the input operation for the measure, that is, the "predetermined time" used for determining an elapsed time at step S18 is set to be too long, there is a risk to spoil usability for the operator in subsequent operations. Therefore, the predetermined time is appropriately set to 0.5 seconds, for example, considering a time taken by the operator to stop the input operation after perceiving the provided tactile sensation. Preferably, the predetermined time may be changed by the operator after being set, or automatically set based on a time learned by the control unit 10 from normal input operations by the operator, such that the time to disable the input operation is appropriately set for each operator. When the control unit proceeds to step S13 after step S18, the control unit 10 determines, at step S13 after step S18, whether a next retrieved character string after the retrieved character string already retrieved and displayed on the display unit 20 before the operation at step S18 is displayed on the display unit 20.

Assumed examples of the character string retrieval apparatus 1 according to the present embodiment will be described below, by using concrete examples.

Example 1

Figure 3:
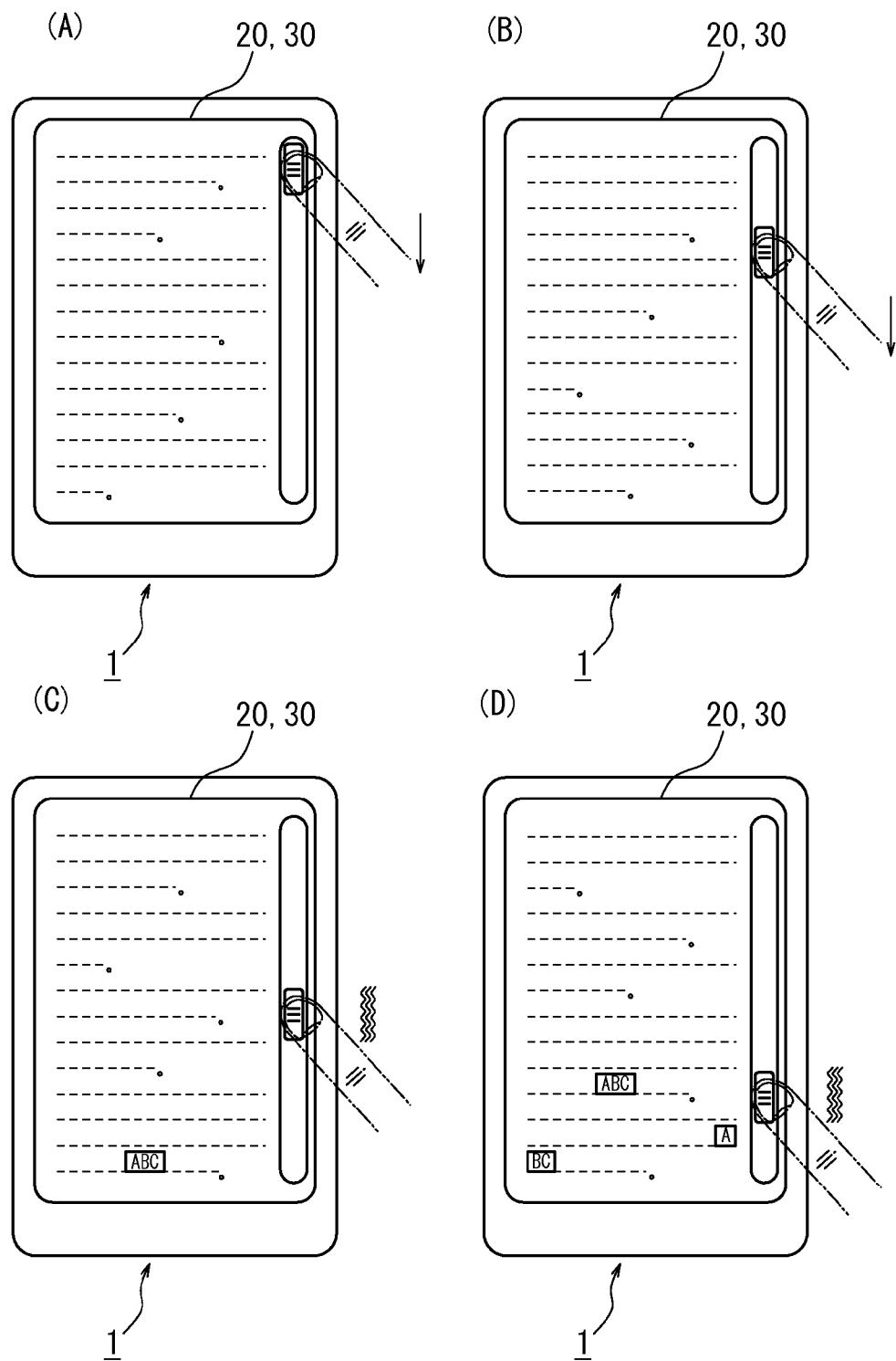
FIG. 3(A) to (D) are diagrams illustrating an example of an action of the character string retrieval apparatus illustrated in FIG. 1.

FIG. 3 illustrates diagrams of an example in which the character string retrieval apparatus 1 according to the present embodiment is applied to the small mobile terminal having the touch sensor. The character string retrieval apparatus 1 illustrated in FIG. 3 has the display unit 20 disposed thereon configured to display the retrieval result of the character string and the like, and the operation unit 30 constituted by using the touch sensor disposed on the display unit 20. At a periphery or on a rear face of the operation unit 30 or the display unit 20, the tactile sensation providing unit 40 (not illustrated) configured to generate vibration at the operation unit 30 is provided. Since the tactile sensation providing unit 40 vibrates, the tactile sensation may be provided to the operator's finger or the like pressing the operation unit 30. Here, the tactile sensation provided by the tactile sensation providing unit 40 may be any tactile sensation such as an instant strong vibration that enables the operator to unfailingly perceive the tactile sensation.

As illustrated in FIG. 3, the character string retrieval apparatus 1 displays an object of the scroll bar along a right periphery of the display unit 20 such that the operation unit 30 of the touch sensor detects an input operation to the object by the operator. The character string retrieval apparatus 1, by using the function of the OS or the browser, may retrieve a character string in the text file of the target and display the retrieval result on the display unit 20. When the retrieved character string is not contained in the search result initially displayed on the display unit 20, the character string retrieval apparatus 1, based on the input operation to shift the scroll bar by the operator, scrolls through the retrieval result displayed on the display unit 20. With reference to FIG. 3, an example to display a retrieval result of a character string "ABC" from the text file of the target will be described.

FIG. 3(A) to (D) schematically illustrate a sequential change of the displayed area on the display unit 20 based on the input operation by the operator's finger. FIG. 3(A) illustrates a state in which, since the retrieved character string is not initially displayed on the display unit 20 as described above, the operator is about to perform the input operation to shift the scroll bar. FIG. 3(B) illustrates a state in which the operator is performing the input operation to slightly shift the scroll bar downward and the displayed area on the display unit 20 is scrolled up based on the input operation. However, the retrieved character string "ABC" is not yet displayed on the display unit 20.

FIG. 3(C) illustrates a state in which the operator is performing an input operation to shift the scroll bar further downward on the operation unit 30 and the displayed area on the display unit 20 is scrolled up based on the input operation. Here, in FIG. 3(C), as a result of shifting the displayed area, the retrieved character string "ABC" is displayed at the bottom of the display unit 20. When the retrieved character string is displayed on the display unit 20 as described above, the character string retrieval apparatus 1 provides the tactile sensation to the pressing object such as the operator's finger or the like pressing the operation unit 30. Accordingly, without carefully observing the displayed area on the display unit 20, for example, the operator may unfailingly recognize that the retrieved character string "ABC" is displayed on the display unit 20 through the tactile sensation at fingertip.

After the retrieved character string is displayed and the tactile sensation is provided as described above, the input operation to the operation unit 30 is disabled for the predetermined time as described with reference to FIG. 2. Therefore, after provision of the tactile sensation, when the operator fails to quickly stop the input operation to shift the scroll bar, moving the character string "ABC" upward and beyond the display screen due to shifting the displayed area on the display unit 20 too much may be prevented.

FIG. 3(D) illustrates a state in which the operator is performing the input operation to shift the scroll bar further downward on the operation unit 30 and the displayed area on the display unit 20 is scrolled up further based on the input operation. Here, FIG. 3(D) illustrates a moment when, as a result of shifting the displayed area, a next retrieved character string "ABC" is displayed, as well as the character string "ABC" previously displayed, at the bottom of the display unit 20. In this case also, the character string retrieval apparatus 1 provides the tactile sensation to the pressing object such as the operator's finger or the like pressing the operation unit 30.

As described above, when the retrieval result is displayed on the display unit 20, information useful to the operator often appears before or after the retrieved character string. For example, in the example in FIG. 3, information (characters and the like) displayed before or after the retrieved character string "ABC" often helps to clarify a context that includes the character string "ABC".

Accordingly, when the tactile sensation is provided at the moment when the retrieved character string is displayed on the display unit 20 and the input operation is disabled for the predetermined time after that, the information immediately after the retrieved character string, which is possibly useful to the operator, may not displayed. According to the present embodiment, therefore, it is preferable that the tactile sensation is provided when the retrieved character string together with a predetermined number of characters before or after the retrieved character string is displayed and then the input operation is disabled for the predetermined time. That is, the control unit 10, when displaying the retrieved character string as well as the unit 20, controls the tactile sensation providing unit 40 such that the tactile sensation is provided to the pressing object pressing the operation unit 30. Preferably, the predetermined number of characters before or after the retrieved character string displayed on the display unit 20 for providing the tactile sensation may be appropriately changed by the operator. For example, the predetermined number of characters is appropriately set within a range between a few characters and a few lines. Thereby, when the retrieval result is displayed on the display unit 20, the retrieved character string is prevented from being displayed too close to the very beginning or end of the displayed area on the display unit 20.

Accordingly, the operator may view the possibly useful information before or after the retrieved character string as well as the retrieved character string. Also, since the retrieved character string is displayed at a readily visible position on the display unit 20, the operator may even more easily spot the retrieved character string in the displayed area of the retrieval result.

According to the present embodiment, as described above, without keeping carefully observing the retrieval result displayed in retrieval of the character string, the operator may unfailingly recognize, through the tactile sensation, that the retrieved character string is displayed. For example, the operator may view the display unit 20 only when the tactile sensation is provided and determine whether the retrieved character string indicates information desired by the operator. The character string retrieval apparatus 1 according to the present embodiment, therefore, may dramatically reduce eye fatigue of the operator in retrieval of the character string. According to the present embodiment, also, since the operator does not need to gaze at the retrieval result in retrieval of the character string, the operator may rapidly scroll through the retrieval result to a position containing the retrieved character string.

Further, since the character string retrieval apparatus 1 according to the present embodiment allows rapid scroll through the displayed area to look for the character string, the operator, at the moment when the retrieved character string is displayed and the tactile sensation is provided, may not quickly stop the operation of such rapid scroll. However, the character string retrieval apparatus 1 according to the present embodiment temporarily disables the input operation when the retrieved character string is displayed and the tactile sensation is provided, thereby suspending scroll of the displayed area. In this case, further, since the retrieved character string is displayed together with the predetermined number of characters before or after the retrieved character string, the retrieved character string is displayed together with the information surrounding the retrieved character string, thereby allowing easy understanding of the context. Accordingly, the operator may quickly spot the retrieved character string unfailingly and easily.

Example 2

Figure 4:
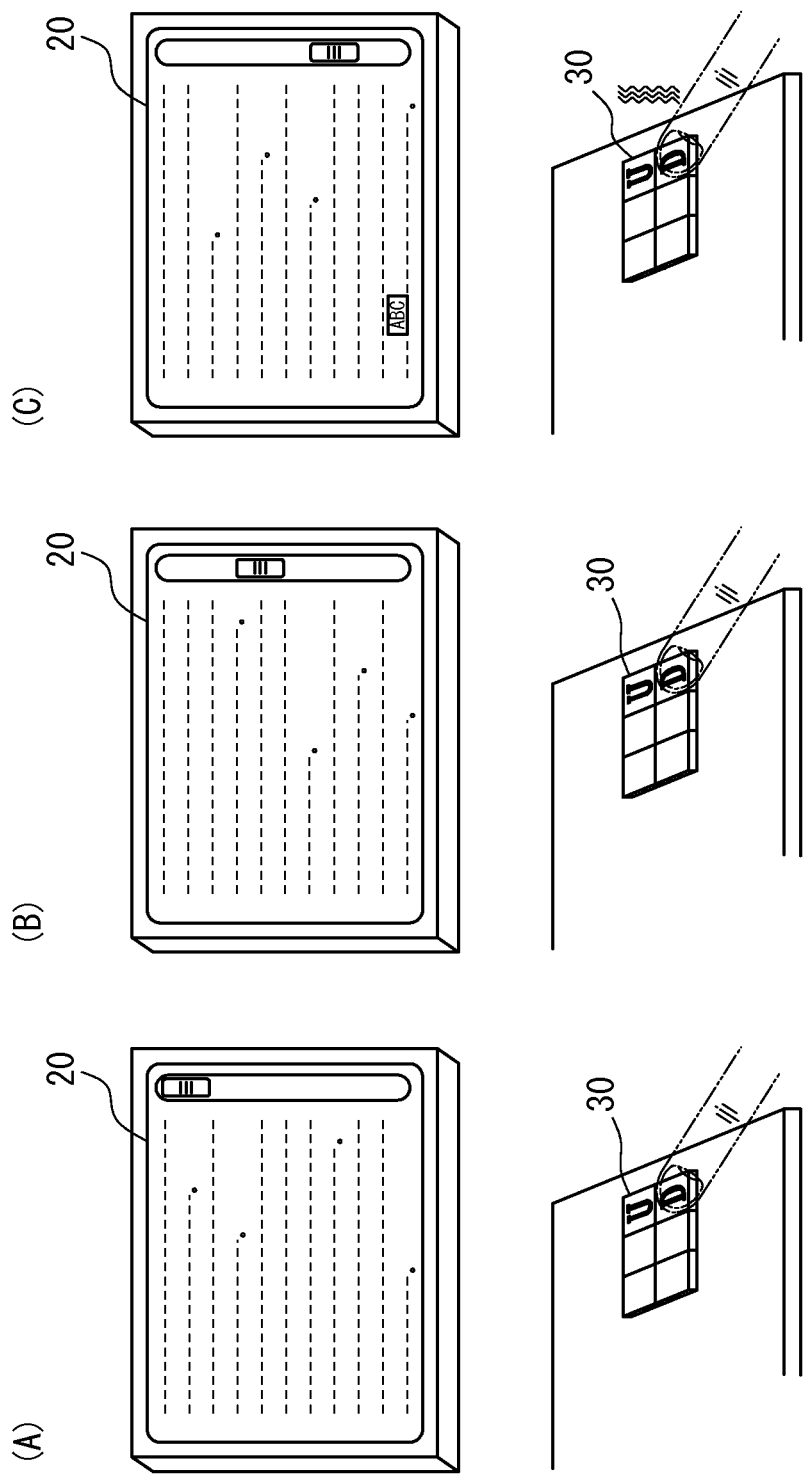
FIG. 4(A) to (C) are diagrams illustrating another example of the action of the character string retrieval apparatus illustrated in FIG. 1.

FIG. 4 illustrates diagrams of an example in which the character string retrieval apparatus 1 according to the present embodiment is applied to a system such as the PC that includes a display and the keyboard. The character string retrieval apparatus 1 illustrated in FIG. 4 has the display for displaying the search result of the character string and the like as the display unit 20 and the keyboard having mechanical push-button switches as the operation unit 30. The tactile sensation providing unit 40 (not illustrated) configured to generate vibration is built in a housing or each key of the operation unit 30. Since the tactile sensation providing unit 40 vibrates, the tactile sensation, through the key of the keyboard, may be provided to the operator's finger or the like operating the operation unit 30. Here, the tactile sensation provided by the tactile sensation providing unit 40 may be any tactile sensation such as the instant strong vibration that enables the operator to unfailingly perceive the tactile sensation.

As illustrated in FIG. 4, the character string retrieval apparatus 1 displays the object of the scroll bar along the right periphery of the display unit 20 such that the keyboard constituting the operation unit 30 detects the input operation by the operator. In a manner similar to Example 1 described above, the character string retrieval apparatus 1, by using the function of the OS or the browser, may retrieve a character string in the text file of the target and display the retrieval result on the display unit 20. When the retrieved character string is not contained in the displayed are of the search result initially displayed on the display unit 20, the character string retrieval apparatus 1, based on the input operation to shift the scroll bar by the operator, scrolls through the retrieval result displayed on the display unit 20. With reference to FIG. 4 also, an example displaying the retrieval result of the character string "ABC" from the text file of the target will be described.

According to the present embodiment, the character string retrieval apparatus 1, based on the input operation to a predetermined key of the operation unit 30 by the operator, scrolls through the retrieval result. As illustrated in FIG. 4, for example, the keyboard constituting the operation unit 30 may have the page up key (a "U" key of the operation unit 30 in FIG. 4) and the page down key (a "D" key of the operation unit 30 in FIG. 4). When an input operation to the "U" key of the keyboard constituting the operation unit 30 is detected, the character string retrieval apparatus 1 scrolls down the retrieval result displayed on the display unit 20 by a predetermined amount (for example, a predetermined number of lines). Similarly, when an input operation to the "D" key of the keyboard constituting the operation unit 30 is detected, the character string retrieval apparatus 1 scrolls up the search result displayed on the display unit 20 by the predetermined amount.

The keyboard constituting the operation unit 30 illustrated in FIG. 4 schematically illustrates a part of the keyboard approximately the same as one used for general operations of the PC, and a rest part of the keyboard is omitted in the figure. The keyboard constituting the operation unit 30 differs from the usual keyboards in having the tactile sensation providing unit 40.

FIG. 4(A) to (C) schematically illustrate the sequential change of the displayed area on the display unit 20 based on the input operation to the keyboard by the operator. FIG. 4(A) illustrates a state in which, since the retrieved character string is not initially displayed on the display unit 20 as described above, the operator is about to perform an input operation to press down the "D" key on the operation unit 30 to scroll up the displayed area. FIG. 4(B) illustrates a state in which the operator is performing the input operation to press down the "D" key on the on the input operation. However, the retrieved character string "ABC" is not yet displayed on the display unit 20.

FIG. 4(C) illustrates a state in which the operator is performing an input operation to further press down the "D" key on the operation unit 30 and the displayed area on the display unit 20 is scrolled up based on the input operation. At this time, either an input operation by the operator to sequentially press the same key for a plurality of times or an input operation by the operator to keep pressing one key (to maintain a state pressing down the key) may be detected to repeat the input. Here, in FIG. 4(C), as a result of shifting the displayed area, the retrieved character string "ABC" is displayed at the bottom of the display unit 20. When the retrieved character string is displayed on the display unit 20 as described above, the character string retrieval apparatus 1 provides the tactile sensation to the pressing object such as the operator's finger or the like pressing the key of the operation unit 30. Thereby, without carefully observing the displayed area on the display unit 20, for example, the operator may unfailingly recognize that the retrieved character string "ABC" is displayed on the display unit 20.

Similarly to Example 1, after the retrieved character string is displayed and the tactile sensation is provided, the input operation to the operation unit 30 is disabled for the predetermined time. According to the present embodiment, in a similar manner to Example 1, also, the tactile sensation is provided when the retrieved character string is displayed together with the predetermined number of characters before or after the retrieved character string.

Example 3

FIG. 5 illustrates diagrams of an example in which the character string retrieval apparatus 1 according to the present embodiment is applied to a system such as the PC that includes the display and the input device such as the mouse. The character string retrieval apparatus 1 illustrated in FIG. 5 has the display for displaying the retrieval result of the character string and the like as the display unit 20 and the mouse serving as the input device as the operation unit 30. The tactile sensation providing unit 40 (not illustrated) configured to generate vibration is built in the housing or each button or the like of the mouse constituting the operation unit 30. Since the tactile sensation providing unit 40 vibrates, the tactile sensation may be provided, via the mouse or the buttons provided thereto, to the pressing object such as the operator's finger or the like operating the operation unit 30. Here, the tactile sensation provided by the tactile sensation providing unit 40 may be any tactile sensation such as the instant strong vibration that enables the operator to unfailingly perceive the tactile sensation.

As illustrated in FIG. 5, the character string retrieval apparatus 1 displays the object of the scroll bar along the right periphery of the display unit 20, and the mouse constituting the operation unit 30 detects the input operation by the operator. In a manner similar to Example 1 described above, the character string retrieval apparatus 1, by using the function of the OS or the browser, may retrieve a character string in the text file of the target and display the retrieval result on the display unit 20. When the retrieved character string is not contained in the display of the retrieval result initially displayed on the display unit 20, the character string retrieval apparatus 1, based on the input operation to shift the scroll bar by the operator, scrolls through the retrieval result displayed on the display unit 20. With reference to FIG. 5 also, an example displaying the retrieval result of the character string "ABC" from the text file of the target will be described.

According to the present embodiment, the character string retrieval apparatus 1, based on an input operation by the operator to drag a pointer (an arrow) displayed on the display unit 20 by using the mouse constituting the operation unit 30, scrolls through the retrieval result. As illustrated in FIG. 5, for example, the character string retrieval apparatus 1, based on an input operation by the operator to place the pointer over a knob of the scroll bar and keep pressing the button of the mouse, may detect the input operation to drag the knob on the scroll bar. That is, the operator, by performing the input operation to drag the pointer over the knob of the scroll bar by using the mouse, may scroll though the retrieval result displayed on the display unit 20. Based on an input operation to drag the knob of the scroll bar upward by using the mouse constituting the operation unit 30, the character string retrieval apparatus 1 scrolls down the retrieval result displayed on the display unit 20. Similarly, based on an input operation to drag the knob of the scroll bar downward by using the mouse constituting the operation unit 30, the character string retrieval apparatus 1 scrolls up the retrieval result displayed on the display unit 20.

The mouse constituting the operation unit 30 illustrated in FIG. 5 schematically represents a mouse approximately the same as one used for general operations of the PC. The mouse constituting the operation unit 30 differs from the usual keyboards in having the tactile sensation providing unit 40.

FIG. 5(A) to (C) schematically illustrate the sequential change of the displayed area on the display unit 20 based on the input operation by the operator using the mouse. FIG. 5(A) illustrates a state in which, since the retrieved character string is not initially displayed on the display unit 20, the operator is about to perform the input operation to drag the knob of the scroll bar downward by using the mouse constituting the operation unit 30 to scroll up the displayed area. FIG. 5(B) illustrates a state in which the operator is performing the input operation to drag the knob of the scroll bar downward by using the mouse constituting the operation unit 30 and the displayed area on the display unit 20 is scrolled up based on the input operation. However, the retrieved character string "ABC" is not yet displayed on the display unit 20.

FIG. 5(C) illustrates a state in which the operator is performing an input operation to further drag the knob of the scroll bar downward by using the mouse constituting the operation unit 30 and the displayed area on the display unit 20 is scrolled up based on the input operation. Here, in FIG. 5(C), as a result of shifting the displayed area, the retrieved character string "ABC" is displayed at the bottom of the display unit 20. When the retrieved character string is displayed on the display unit 20 as described above, the character string retrieval apparatus 1 provides the tactile sensation to the pressing object such as the operator's finger or the like operating the mouse constituting the operation unit 30. Thereby, without carefully observing the displayed area on the display unit 20, for example, the operator may unfailingly recognize that the retrieved character string "ABC" is displayed on the display unit 20.

Similarly to Example 1, after the retrieved character string is displayed and the tactile sensation is provided, the input operation to the operation unit 30 is disabled for the predetermined time. According to the present embodiment, in a manner similar to Example 1, also, the tactile sensation is provided when the retrieved character string is displayed together with the predetermined number of characters before or after the retrieved character string.

Note that, although according to Example 3 the displayed area is shifted based on the input operation by the operator to drag the knob of the scroll bar by using the mouse, the operator may also shift the displayed area by an input operation to rotate the scroll wheel provided to the mouse. According to the present embodiment, that is, when the operation unit 30 detects the input operation by the operator to scroll through the displayed area by rotating the scroll wheel and the retrieved character string is displayed on the display unit 20, the tactile sensation may be provided via the scroll wheel. In this case, a mechanism to transmit the tactile sensation of vibration generated by the tactile sensation providing unit 40 to the scroll wheel is required. Such a mechanism allows to provide the tactile sensation via the scroll wheel when the operator performs the input operation to rotate the scroll wheel with the finger or the like, and enables the operator to recognize that the retrieved character string is displayed on the display unit 20.

It is to be understood that the present invention is not limited to the embodiment set forth above but may be varied or changed in a multiple manner. For example, although according to the above embodiment both of the application necessary for the retrieval operation and the data of the target are retrieved from the memory unit 50, a method to retrieve the character string is not limited thereto.

Figure 6:
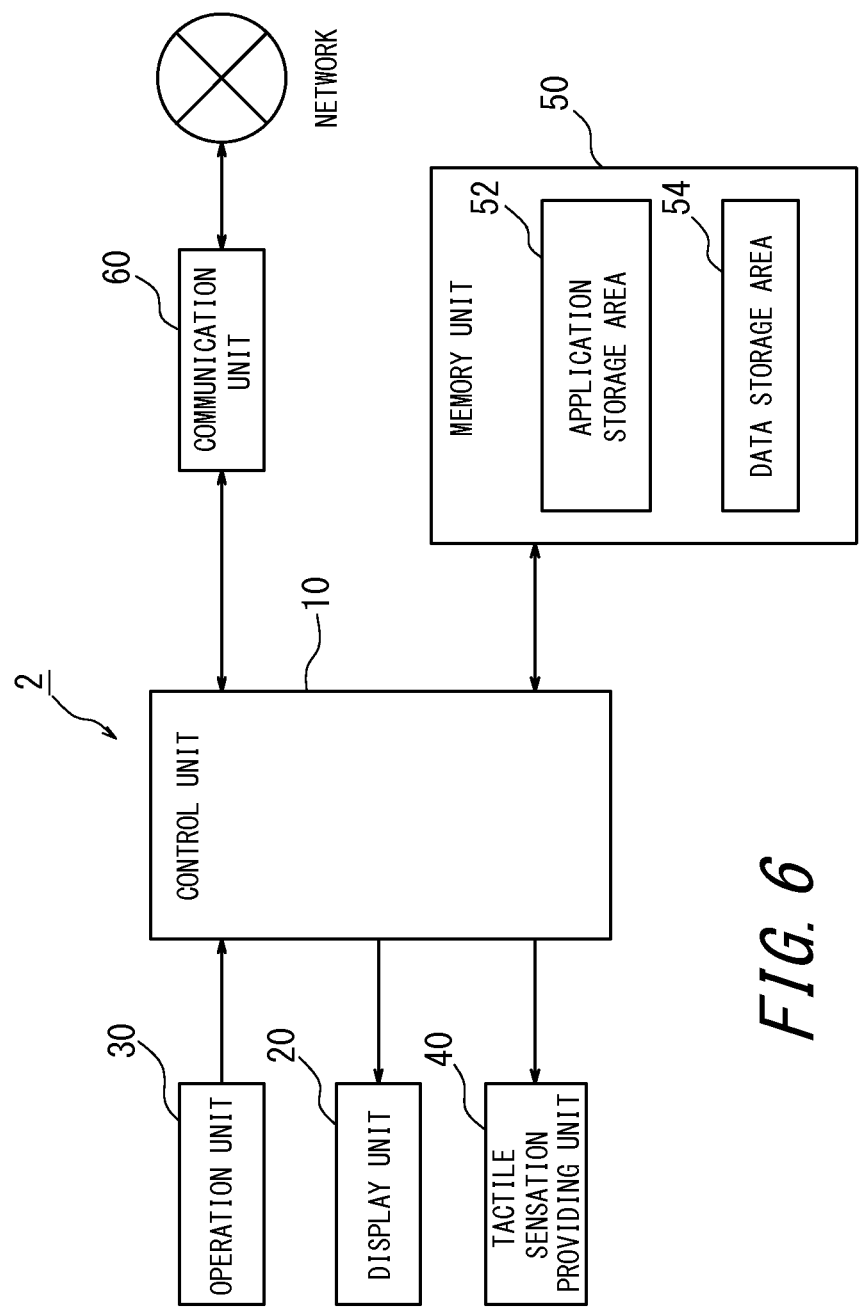
FIG. 6 is a block diagram illustrating a schematic configuration of a variation of the character string retrieval apparatus according to an embodiment.

For example, a character string retrieval apparatus 2 illustrated in FIG. 6 has a communication unit 60 in addition to the configuration of the character string retrieval apparatus 1 described above. The communication unit 60, by communicating with an external network, transmits and receives various data. In retrieval of the character string by using the character string retrieval apparatus 2, both of the application necessary for the retrieval operation and the data of the target may be externally received via the communication unit. In this case, when neither of the application storage area 52 nor the data storage area 54 stores the necessary data and the like, the character string retrieval apparatus 2 may retrieve the character string by receiving the data and the like through the external communication. Alternatively, the retrieval operation itself may be performed outside the character string retrieval apparatus 2 and the character string retrieval apparatus 2 may receive the retrieval result via the reception unit 60. In this case, the character string retrieval apparatus 2, based on the retrieval result externally supplied, may display the character string contained in the retrieval result and provide the tactile sensation.

Also, according to the embodiment and each of the examples described above, in displaying the retrieved character string on the display unit 20, an appropriate sound may be generated at provision of the tactile sensation, thereby attracting more attention of the operator. In displaying the retrieved character string on the display unit 20, further, the retrieved character string may be colored. Thereby, the operator may easily spot the position displaying the retrieved character string on the display unit 20 at a glance when the tactile sensation is provided.

Further, the tactile sensation providing unit 40 may be constituted in a variety of manners such as by using any number of piezoelectric vibrators, transparent piezoelectric elements provided on an entire surface of the touch panel or, when vibration to provide the tactile sensation may be generated, an eccentric motor which rotates 360 degrees in 1 cycle of a drive signal.

REFERENCE SIGNS LIST

1 character string retrieval apparatus
10 control unit
20 display unit
30 operation unit
40 tactile sensation providing unit
50 memory unit
52 application storage area
53 data storage area
60 communication unit

The invention claimed is:

1. A character string retrieval apparatus for retrieving a character string from a target, comprising:
   a display configured to display a retrieval result of the character string; an input device having at least one switch and/or at least one touch sensor configured to detect an input operation;
   a tactile sensation provider configured to vibrate the input device; and
   a controller configured to, based on the input operation detected by the input device, control to shift an area of the retrieval result of the character string displayed on the display, wherein
   the controller, in displaying a retrieved character string on the display, controls the tactile sensation provider such that a tactile sensation is provided to a pressing object pressing the input device,
   the controller, in displaying the retrieved character string together with a predetermined number of characters before or after the retrieved character string on the display, controls the tactile sensation provider such that the tactile sensation is provided to the pressing object,
   the controller, in displaying the retrieved character string on the display, controls to disable the input operation detected by the input device for a predetermined time, the predetermined time is operator dependent, the operator dependent predetermined time is set based at least in part on an automatic determination based on a time learned by the controller from normal input operations by the operator, and
   the tactile sensation includes an instant strong vibration, wherein the instant strong vibration is provided at a moment when the retrieved character string is displayed on the display, and wherein the instant strong vibration has a strength greater than a strength of a vibration provided at a time other than the moment when the retrieved character string is displayed on the display.

2. The character string retrieval apparatus of claim 1, wherein a mobile terminal includes the input device.

3. The character string retrieval apparatus of claim 1, wherein a keyboard for a personal computer includes the input device.

4. The character string retrieval apparatus of claim 1, wherein a mouse for a personal computer includes the input device.

5. A character string retrieval apparatus for retrieving a character string from a target, comprising:
   a display configured to display a retrieval result of the character string;
   an input device having at least one switch and/or at least one touch sensor;
   a tactile sensation provider configured to vibrate the input device;
   a controller configured to, based on the input operation detected by the input device, control to shift an area of the retrieval result of the character string displayed on the display, wherein
   the controller, in displaying a retrieval character string on the display, controls the tactile sensation provider such that a tactile sensation is provided to a pressing object pressing the input device,
   the controller, in displaying the retrieved character string together with a predetermined number of characters before or after the retrieved character string on the display, controls the tactile sensation provider such that the tactile sensation is provided to the input device,
   the controller, in displaying the retrieved character string on the display, controls to disable the input operation detected by the input device for a predetermined time, the predetermined time is operator dependent, the operator dependent predetermined time is set based on a static value considering a time taken by an operator to stop the input operation after perceiving a provided tactile sensation, and
   the tactile sensation includes an instant strong vibration, wherein the instant strong vibration is provided at a moment when the retrieved character string is displayed on the display, and wherein the instant strong vibration has a strength greater than a strength of a vibration provided at a time other than the moment when the retrieved character string is displayed on the display.

6. The character string retrieval apparatus of claim 5, wherein a mobile terminal includes the input device.

7. The character string retrieval apparatus of claim 5, wherein a keyboard for a personal computer includes the input device.

8. The character string retrieval apparatus of claim 5, wherein a mouse for a personal computer includes the input device.

9. A character string retrieval apparatus for retrieving a character string from a target, comprising:
   a display configured to display a retrieval result of the character string;
   an input device having at least one switch and/or at least one touch sensor;
   a tactile sensation provider configured to vibrate the input device; a processor controller configured to, based on the input operation detected by the input device, control to shift an area of the retrieval result of the character string displayed on the display, wherein
   the controller, in displaying a retrieval character string on the display, controls the tactile sensation provider such that a tactile sensation is provided to a pressing object pressing the input device,
   the controller, in displaying the retrieved character string together with a predetermined number of characters before or after the retrieved character string on the display, controls the tactile sensation provider such that the tactile sensation is provided to the input device,
   the controller, in displaying the retrieved character string on the display, controls to disable the input operation detected by the input device for a predetermined time, the predetermined time is operator dependent, the operator dependent predetermined time is set based on an automatic determination based on a time learned by the processor controller from normal input operation by the operators and the tactile sensation includes an instant strong vibration, wherein the instant strong vibration is provided at a moment when the retrieved character string is displayed on the display, and wherein the instant strong vibration has a strength greater than a strength of a vibration provided at a time other than the moment when the retrieved character string is displayed on the display.

10. The character string retrieval apparatus of claim 9, wherein a mobile terminal includes the input device.

11. The character string retrieval apparatus of claim 9, wherein a keyboard for a personal computer includes the input device.

12. The character string retrieval apparatus of claim 9, wherein a mouse for a personal computer includes the input device.

* * * * *